Dec. 1, 1964    H. RAPPARLIE    3,159,266
CONVEYOR
Filed Aug. 21, 1961

INVENTOR
Hans Rapparlie
BY *George H. Spencer*
ATTORNEY

3,159,266
CONVEYOR
Hans Rapparlie, Konstanz (Bodensee), Germany, assignor to Telefunken Patentverwertungs - G.m.b.H., Ulm (Danube), Germany
Filed Aug. 21, 1961, Ser. No. 132,948
Claims priority, application Germany Aug. 19, 1960
9 Claims. (Cl. 198—29)

The present invention relates generally to conveyors, and more particularly to conveying means for aligning flat objects especially mail shipments, so that one edge thereof contacts an abutment surface.

In automatic sorting or distributing plants, this type of shipment alignment is necessary to various locations. For example, before entering a scanning device, the shipments must be aligned. During the sorting operation, this alignment of the shipments with respect to a reference edge of an abutment surface is disturbed, especially after passing through rotating and turning devices. In a turning or rotating device, the top and bottom edges of the shipments are reversed. When a large range of sizes is to be handled, the smaller shipments, especially postcards, are in the upper part of the conveying track after the turning or rotating operation. They now must be realigned with their bottom edges (formerly the top edges) along a lower abutment surface.

It is known to use free running conveyors for such alignment wherein the shipments align themselves due to the force of gravity. In such free running systems, especially when using high conveying speeds, disturbances are very easily created since individual shipments pendulate or even turn over. It has also been proposed to align the shipments along an abutment surface by means of aligning rollers having axes which are inclined against the direction of conveying. The shipments are transported between a conveyor belt and the aligning rollers. The conveyor belt is made of a material with as smooth a surface as possible while the aligning rollers have a coating with an adhering quality. Due to the effect of the aligning rollers, the shipments slide obliquely on the conveyor belt against the abutment surface. The aligning rollers engage the letters in a region which is point shaped. Because of this, the course of the shipments along the aligning path is not very stable and shipments, especially the smaller ones, tend to pendulate. Small shipments, and especially postcards, must be moved through a greater distance to contact the abutment surface than larger shipments. The aligning path must align even small shipments consistently and with certainty. This urges large shipments against the abutment surface with relatively great force even when they already have one edge against the abutment surface. Since the aligning rollers engage the shipments very firmly, the reference edge of large shipments may very well be damaged.

With these defects of the prior art in mind, it is a main object of this invention to provide conveyor means for aligning shipments wherein shipments of all sizes are properly aligned.

Another object of the invention is to provide a shipment aligning device which properly aligns shipments, yet does not damage any of the larger shipments.

A further object is to provide a device of the character described wherein there may be some slip so that shipments will not be damaged.

These objects and others ancillary thereto are accomplished according to a preferred embodiment of the invention wherein a main conveyor belt is provided having an abutment surface disposed at right angles thereto. Conveyor movement is parallel to this surface. An aligning belt faces the main conveyor belt and the direction of movement thereof is toward the abutment surface and at an acute angle to the direction of conveying of the main conveyor belt. The aligning belt securely guides a shipment along the entire aligning path so that the shipments cannot pendulate. Moreover, the pressure exerted by the aligning belt on the shipment is not excessive, so that a large shipment abutting against the abutment surface can slide between the aligning belt and the conveyor belt. In addition, an aligning belt offers constructional advantages since the aligning belt is guided over two guide rollers having fixed supports. The drive for the aligning belt is fixed. When aligning rollers are used, each individual aligning roller has to be driven separately. The axis of the aligning roller has to be movable, for instance rotatable, since the inclination of the aligning roller has to be adjusted to the size of the shipments to be processed. The inclination of the aligning belt is not this critical, since the shipments may slide between the aligning belt and the conveyor belt.

Additional objects and advantages of the present invention will become apparent upon consideration of the following description when taken in conjunction with the accompanying drawings in which.

Figure 1:
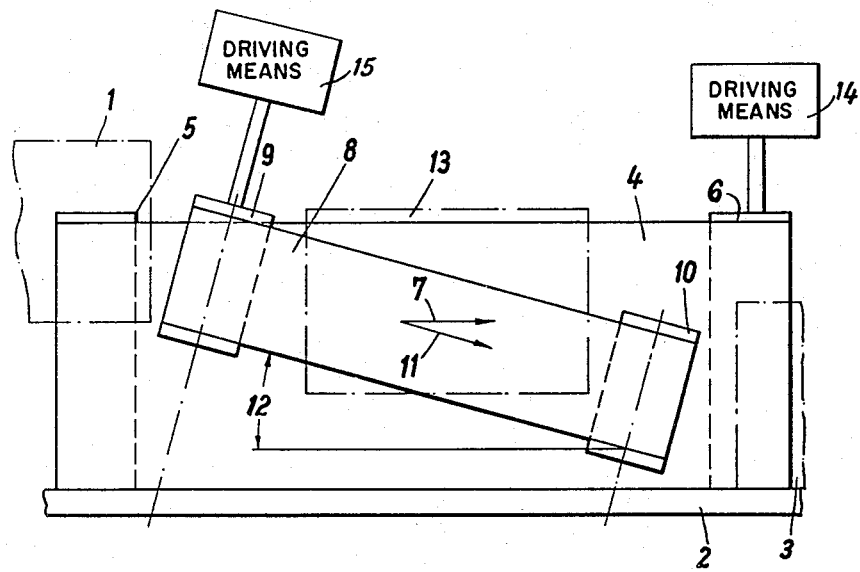
FIGURE 1 is a schematic elevational view of the belts comprising the present invention.

With more particular reference to the drawing, it is assumed that the aligning track is arranged following a turning device known per se. Shipments 1 leaving the turning device are aligned along their top edges. The shipments are to be aligned in an aligning path so that their bottom edges are aligned along an abutment surface 2, as shown by the position of a shipment 3. A conveyor belt 4 guides the shipments along one side thereof. Conveyor belt 4 runs over rollers 5 and 6 which serve as guide rollers or supporting rollers. Roller 6 may be driven by drive means 14. The plane of conveyor 4 is disposed at right angles to abutment surface 2 and moves parallel to this surface in the direction of arrow 7. An alignment belt 8 passing over guide rollers 9 and 10 is provided which opposes conveyor belt 4. Roller 9 may be driven by drive means 15. The direction of movement 11 of the aligning belt is toward the abutment surface 2. The direction of movement 11 of the aligning belt and the direction of conveying 7 of the conveyor belt form an angle 12. Preferably, the velocity $v$ of the aligning belt is such that the component of the velocity $v$ in the direction of the conveying velocity $V$ is equal to the latter. Thus, $V=v/\cos \alpha$, $\alpha$=angle 12.

Figure 2:
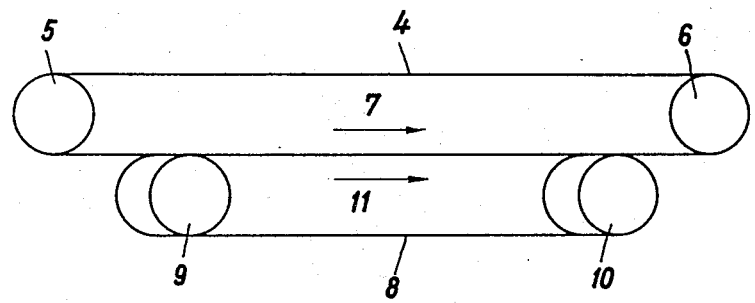
FIGURE 2 is a plan view of the device of FIGURE 1.

Shipments 1 are guided parallel to the abutting surface 2 by conveying means (not shown) which cooperate with the conveyor belt 4. The shipments then reach the effective range of aligning belt 8, which directly abuts against the conveyor belt 4, as shown in FIGURE 2. The conveyor belt 4 is made of a material having a smooth surface so that the shipments can easily slide along the conveyor belt. The aligning belt 8, on the other hand, is made of a material having as rough a surface as possible so that the shipments are engaged by or adhere to the aligning belt. A shipment 13 is guided by the aligning belt 8 toward the abutting surface 2. When this occurs shipment 13 slides on the conveyor belt 4.

Since shipments 1 are originally aligned along their top edges, a large shipment must be moved in the direction toward the abutting surface 2 through a smaller distance than a small shipment. The aligning belt 8 must be adjusted so that even the small shipments will definitely reach the abutment surface 2. The bottom edges of the large shipments will abut against the abutment surface 2 even before completely traversing the aligning belt. The aligning belt exerts a force, toward the abutment surface 2, on the large shipments already abutting against the surface 2. Since the aligning belt is flexible with respect to the conveyor 4, a shipment can slide relative to the aligning belt, without being damaged. The guide rollers 9 and 10 of the aligning belt are arranged between two adjacent supporting rollers or guide rollers of the conveyor belt. These guide rollers 9 and 10 have fixed supports as do the rollers 5 and 6. However, the conveyor belt 4 can yield over the entire range of the aligning belt 8 when shipment of varying thickness pass through, since it is elastic and is not supported in this region by supporting rollers or other means.

With an aligning path according to the present invention, the shipments are securely guided toward an abutment surface. The aligning belt handles the shipments very gently so that damage is avoided. The adjustment of the angle of inclination α is not critical. The present invention is especially suitable for use in connection with a turning belt. However, it may also be used at other locations in a sorting plant. For example, a device according to the invention may also be used when the shipments progressing along a conveyor are to be lifted or lowered into another plane.

It will be understood that the above description of the present invention is susceptible to various modifications, changes, and adaptations, and the same are intended to be comprehended within the meaning and range of equivalents of the appended claims.

What is claimed is:

1. Conveying means for aligning flat objects, especially mail shipments and the like, comprising, in combination: a conveyor belt having a conveying surface; means forming an abutment surface extending in a plane parallel to the direction of movement of said conveyor belt and at right angles to said conveying surface thereof, against which abutment surface objects on said conveyor belt may be brought into engagement; an aligning belt; and means for driving said belts, said aligning belt facing said conveyor belt and having an aligning surface engaging objects being conveyed by said conveyor belt, said aligning belt being arranged so that its direction of movement is toward said abutment surface at an acute angle to the direction of conveying of said conveyor belt, whereby objects being conveyed by said conveyor belt will be engaged by said aligning belt and be moved into alignment along said abutment surface.

2. Conveying means according to claim 1, wherein the conveyor belt is made of a material having a smooth surface.

3. Conveying means according to claim 1, wherein the aligning belt is made of a material having an adhering surface.

4. Conveying means according to claim 1, comprising a pair of guide rollers for each belt, the two guide rollers of the aligning belt being arranged between the guide rollers of the conveyor belt.

5. Conveying means for aligning flat objects, especially mail shipments and the like, comprising, in combination: a conveyor belt having a conveying surface; means forming an abutment surface extending in a plane parallel to the direction of movement of said conveyor belt and at right angles to said conveying surface thereof, against which abutment surface objects on said conveyor belt may be brought into engagement; an aligning belt, facing said conveyor belt and having an aligning surface engaging objects being conveyed by said conveyor belt, said aligning belt being arranged so that its direction of movement is toward said abutment surface at an acute angle to the direction of conveying of said conveyor belt, whereby objects being conveyed by said conveyor belt will be engaged by said aligning belt and be moved into alignment along said abutment surface; and means for driving said belts so that the velocity component of the aligning belt in the direction of conveying corresponds to the velocity of the conveyor belt.

6. In a shipment distributing plant having a shipment turning or rotating device for imparting rotating movement to shipments and conveying means disposed immediately behind the device for receiving shipments which have rotating momentum, the improvement wherein the conveying means comprises: a conveyor belt having a conveying surface; means adjacent said conveyor belt forming an abutment surface extending in a plane parallel to the direction of movement of said conveyor belt and at right angles to said conveying surface thereof, said abutment surface being sufficiently close to said conveyor belt that objects on said belt may be brought into engagement with said surface; an aligning belt; and means for driving said belts, said aligning belt facing said conveyor belt and having an aligning surface engaging objects being conveyed by said conveyor belt, said aligning belt being arranged so that its direction of movement is toward said abutment surface at an acute angle to the direction of conveying of said conveyor belt, whereby objects being conveyed by said conveyor belt will be engaged by said aligning belt and be moved into alignment along said abutment surface, and so that the rotating momentum of shipments entering said conveying means will be stopped.

7. Conveying means for aligning flat objects, especially mail shipments and the like, comprising, in combination: a conveyor belt having a conveying surface; means adjacent said conveyor belt defining an aligning surface sufficiently close to said conveyor belt that objects on said belt may be brought into engagement with said surface; an aligning belt having a conveying surface facing the conveying surface of said conveyor belt; and means for driving said belts, said aligning belt being arranged so that the direction of movement of its conveying surface is toward said aligning surface at an acute angle to the direction of conveying of said conveyor belt, said conveying surfaces being arranged to provide relatively large area contact with both sides of a shipment to gently engage a shipment and move it into alignment with said aligning surface.

8. Conveying means as defined in claim 7 wherein said conveying surfaces extend substantially over the entire widths of the respective belts.

9. Conveying means as defined in claim 7, comprising a pair of guide rollers for each belt, the two guide rollers of the aligning belt being arranged between the guide rollers of the conveyor belt.

References Cited in the file of this patent

UNITED STATES PATENTS

| | | |
|---|---|---|
| 2,300,625 | Martin | Nov. 3, 1942 |
| 2,687,886 | Pitner | Aug. 31, 1954 |
| 2,941,653 | Kriemelmeyer | June 21, 1960 |
| 3,044,600 | Miller | July 17, 1962 |

FOREIGN PATENTS

| | | |
|---|---|---|
| 1,143,776 | France | Apr. 15, 1957 |